(12) United States Patent
Harkness et al.

(10) Patent No.: US 6,639,960 B2
(45) Date of Patent: Oct. 28, 2003

(54) METHOD OF RETROFITTING A REACTOR PRESSURE VESSEL HEAD ASSEMBLY

(75) Inventors: Alexander W. Harkness, Gibsonia, PA (US); Michael G. Ball, Irwin, PA (US); Robert L. Keller, Connellsville, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/972,728

(22) Filed: Oct. 5, 2001

(65) Prior Publication Data

US 2003/0179845 A1 Sep. 25, 2003

Related U.S. Application Data

(60) Provisional application No. 60/239,017, filed on Oct. 6, 2000.

(51) Int. Cl.$^7$ .............................................. G21C 19/00
(52) U.S. Cl. ...................... 376/260; 376/284; 376/293; 376/298; 376/263
(58) Field of Search ................................ 376/260, 293, 376/298

(56) References Cited

U.S. PATENT DOCUMENTS

| | | | |
|---|---|---|---|
| 3,726,759 A | * 4/1973 | Taft et al. .................... | 376/284 |
| 4,238,289 A | 12/1980 | Weems et al. | |
| 4,302,290 A | 11/1981 | Mazur et al. | |
| 4,654,188 A | * 3/1987 | Hankinson ............... | 250/515.1 |
| 4,678,623 A | 7/1987 | Malandra et al. | |
| 4,830,814 A | * 5/1989 | Altman ........................ | 376/263 |
| 5,742,652 A | 4/1998 | Hankinson et al. | |
| 5,930,321 A | 7/1999 | Harkness et al. | |
| 6,061,415 A | * 5/2000 | Harkness et al. ........... | 376/260 |

OTHER PUBLICATIONS

Kim et al., "Integrated Head Assembly for the Korean Next Generation Reactor," Transactions of the 15th International Conference on Structural Mechnics in Reactor Technology, Seoul, Korea, Aug. 15–20, 1999.*

* cited by examiner

Primary Examiner—Michael J. Carone
Assistant Examiner—R Palabrica

(57) ABSTRACT

A head assembly of a reactor pressure vessel in an ice condenser plant is retrofitted to permit the assembly to be removed during a later refueling operation in reduced time and with reduced exposure to radiation by operating personnel. The portions of the ductwork ventilation system that originally provided cooling air to CRDMs are removed below the seismic support platform. The original CRDM cooling shroud that surrounds the lower portion of the CRDM assemblies is extended to the seismic support platform. A plenum is mounted on the seismic support platform and in air flow communication with interior portion of the extended CRDM cooling shroud. The plenum fits under the missile shield. Spool pieces are connected between the plenum and the portion of the ductwork adjacent to the seismic support platform. Later, during refueling operations, the RPV head assembly can be disconnected from and reconnected to the ductwork of the ventilation system without the need for scaffolding around the RPV head assembly and with reduced exposure to radiation by operating personnel.

5 Claims, 2 Drawing Sheets

US 6,639,960 B2

METHOD OF RETROFITTING A REACTOR PRESSURE VESSEL HEAD ASSEMBLY

CROSS REFERENCE

This application is entitled to the filing date of U.S. patent application Ser. No. 60/239,017, filed Oct. 6, 2000.

BACKGROUND OF THE INVENTION

The invention relates to method of retrofitting a head assembly of a reactor pressure vessel (RPV) in a pressurized water nuclear reactor (PWR) for facilitating the removal and reinstallation of the RPV's closure head during a refueling operation and, more particularly, to a method for retrofitting a RPV in a pressurized water nuclear reactor having ice condensers for absorbing large amounts of heat in the event of a severe accident.

In commercial PWRs, RPVs have control rods for controlling the nuclear reaction in fuel assemblies located in their core regions. The control rods are vertically operated by assemblies known as control rod drive mechanisms (CRDMs). The CRDMs are vertically supported on removable closure heads bolted to the RPVs, laterally supported by seismic support platforms and vertically restrained by overhead missile shields. In addition to supporting the CRDMs, the closure heads mechanically support complex ventilation systems located above the closure heads for providing substantial, continuous flow of ambient containment air to cool the CRDM electromagnetic coils. See, in this regard, FIG. 1 of U.S. Pat. No. 4,678,623, which illustrates a head arrangement found in many commercial facilities.

During refueling operations, the RPV closure heads, CRDMs and their supporting subsystems and other devices located over the closure heads must be disassembled, lifted and removed so that the RPV closure heads can be removed and spent fuel assemblies in the core regions of the RPVs can be rearranged or replaced with fresh fuel assemblies. To reduce the time required to remove and reinstall RPV closure heads in order to refuel nuclear reactors, integrated head assembly designs were developed in the 1980s as backfits for the type of design discussed above. U.S. Pat. No. 4,678,623 shows a backfit integrated head assembly wherein elbow ducts 22 extending from a lower manifold 20 to an upper manifold 24 located over a missile shield 34 (as shown in FIG. 1) were replaced with a duct arrangement 136, 138 and 140 (as shown in FIG. 2). More recently, the integrated head assembly designs have been simplified to further reduce the time required to remove and reinstall the RPV closure heads and thereby to reduce radiation exposure by operating personnel. See, in this regard, U.S. Pat. No. 5,742,652 and 5,930,321. The disclosures U.S. Pat. No. 4,678,623; 5,742,652 and 5,930,321 are incorporated by reference for their disclosures of the structures and functions of integrated head assemblies and simplified head assemblies.

For several reasons, the integrated head assembly designs and the later simplified head assembly designs have not been employed in PWRs having ice condensers in compartments for absorbing large amounts of heat in the event of a severe accident. See, in this regard, U.S. Pat. No. 4,238,289, which illustrates in FIG. 1a PWR containment building 10 containing ice condenser compartments 18 located above an operating deck 24 and a RPV 26 located below the operating deck 24 in a tight RPV compartment defined in part by primary shields 46 and a large heavy concrete missile shield 50. First, the concrete missile shields of ice condenser plants provide pressure boundaries for loss of coolant events. Second, the clearances between the PWR plants the missile shields and the seismic support platforms for laterally supporting the CRDMs are so limited that there is not enough space for the integrated head designs and simplified head designs that have been developed. Third, compartmentalization in the containment buildings in which the PRVs are located is such that the heat removed from the CRDM cooling air must be removed before the air can be discharged back into the general atmosphere in the containment buildings. In addition, the integrated head designs and the simplified head designs do not provide cooling prior to discharge of the cooling air into the general atmosphere in the containment building.

The nuclear industry has developed a modified head assembly design for RPVs in ice condenser plants for reducing refueling times and radiation exposures. For the reasons stated above, the modified design doesnot incorporate a missile shield or a permanently attached lift rig. The modified design includes a RPV closure head, CRDMs, seismic support plate and a CRDM cooling shroud. The modified design also includes connections with the outlets of cooling air ductwork located in the RPV compartments between the seismic support plates and the RPVs for directing cooling air from the general atmosphere within the containment building to the CRDMs. In the course of refueling operations, scaffolding must be erected over the RPV compartment after the missile shield has been removed for connecting and disconnecting the cooling air ductwork before the head assembly can be removed.

Although the modified head assembly has reduced refueling times and radiation exposures, the nuclear industry desires to further reduce refueling time and radiation exposures with improved safety.

SUMMARY OF THE INVENTION

It is an object of the present invention to provide a method for backfitting the PRV head assemblies in ice condenser plants in order to permit their removal and reinstallation during a refueling operations in a shorter period of time and with reduced radiation exposure. It is a further object to provide a design that can be backfit into the limited space of commercial ice condenser plants.

With these objects in view, the present invention resides in a method for retrofitting a RPV head assembly in an existing ice condenser type PWR generally having a containment building containing the RPV, a missile shield superposed over the RPV head assembly and a ventilation system for directing cooling air from the atmosphere within the containment building toward the head assembly during power operations.

A head assembly to be retrofitted generally includes a RPV head, a plurality of CRDMs extending upwardly from the RPV head, a seismic support platform above the RPV head laterally supporting the CRDMs, and a CRDM cooling shroud surrounding a portion of the CRDMs and extending upwardly from the RPV head to a terminal end spaced from the seismic support platform. The ventilation system generally includes ductwork extending from one or more ventilation fans and heat exchangers remote from the RPV to outlets located adjacent the head assembly between the RPV closure head and the seismic support platform. The ductwork outlets may be connected to radiation shields or other structures extending upwardly of the RPV closure heads.

The practice of the method of retrofitting the RPV head assembly generally includes the steps of: removing at least a portion of the ventilation ductwork extending below the seismic support platform; extending the CRDM cooling shroud to the seismic support platform; mounting a plenum on the seismic support platform and in air flow communication with interior portion of the extended CRDM cooling shroud and under the missile shield; and connecting one end of a removable spool piece to the plenum and a second end of the removable spool piece to the ductwork adjacent to the seismic support platform. Advantageously, in the course of later refueling operations, the RPV integrated head assembly can be disconnected from and reconnected to the ductwork of the ventilation system without interference with a detachable lift device and without the need for scaffolding around the RPV integrated head assembly.

BRIEF DESCRIPTION OF THE DRAWING

The invention as set forth in the claims will become more apparent from the following detailed description of a preferred practice thereof shown, by way of example only, in the accompanying drawing, wherein:

DESCRIPTION OF THE PREFERRED PRACTICE

Figure 1:
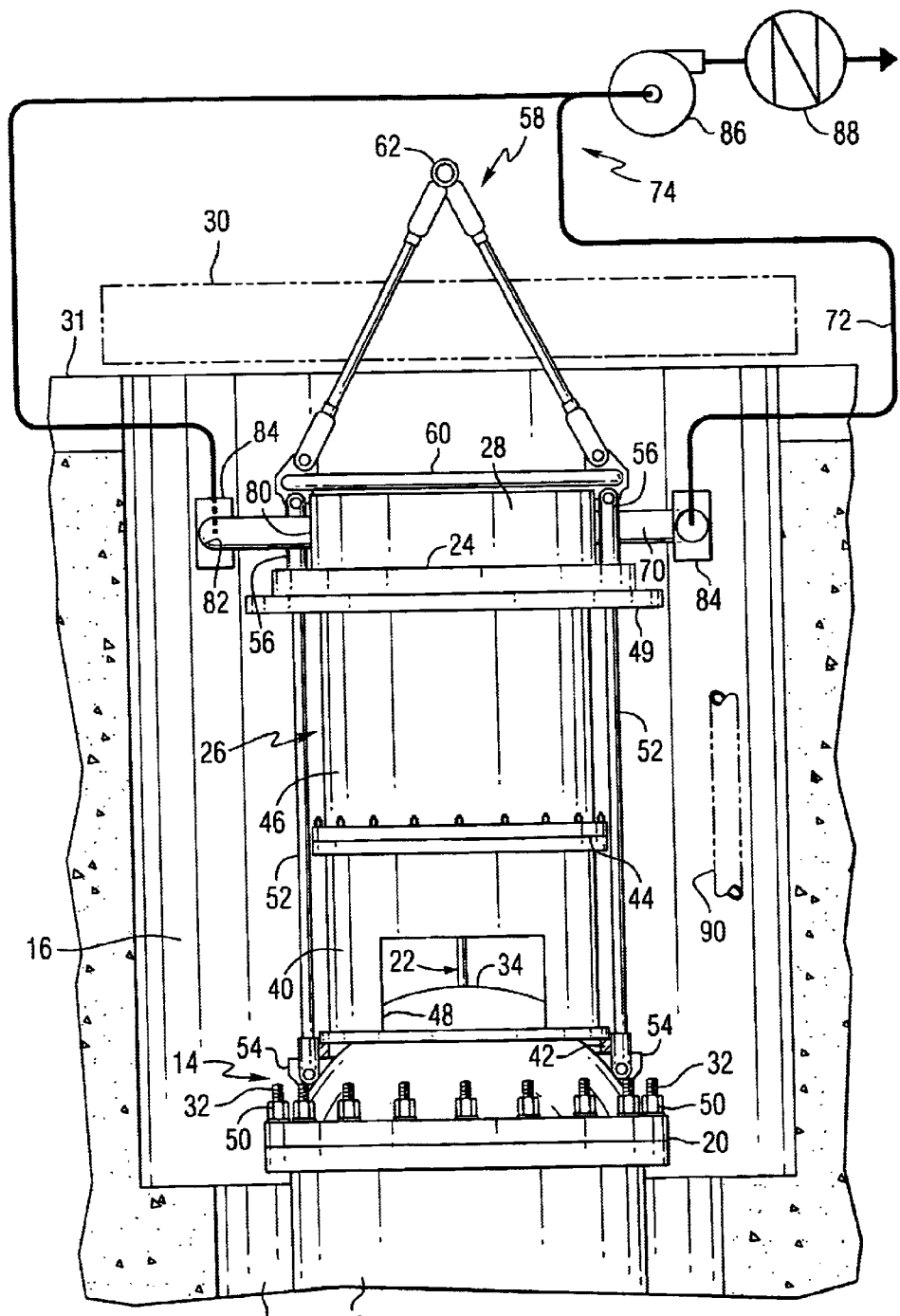
FIG. 1 is a schematic representation of a modified RPV head.

FIG. 1 shows a RPV 10 that has been retrofitted for practicing the present invention in an ice condenser plant. It is noted that FIG. 1 shows the structures and components of plant out of scale and proportion for ease of illustration. The RPV 10 is located in a reactor cavity 12 and has a head assembly 14 extending upwardly into a tight compartment 16 located at the end of a refueling canal. The head assembly 14 generally includes a RPV closure head 20, a plurality of CRDM assemblies (represented by CRDM 22), a seismic support platform 24 for laterally supporting the CRDMs 22, a CRDM cooling shroud 26 surrounding the CRDMs 22 and extending from the RPV closure head 20 to the seismic support platform 24 and a plenum 28. During power operations, a concrete missile shield 30(shown in phantom) will be removably supported independently of the head assembly 14 at about the level of the plant's operating deck 31 over the head assembly 14.

The RPV closure head 20 shown in FIG. 1 is bolted to the RPV 10 on studs 32. Also, the head 20 is covered with head insulation 34.

The CRDM cooling shroud 26 shown in FIG. 1 includes an original CRDM cooling shroud 40 (or a replacement panel), which may be supported by the closure head 20 via a support ring 42 or other suitable means. The cooling shroud of an existing ice condenser plant extends from the support ring 42 to a terminal end 44 spaced from the seismic support platform 24. The retrofitted CRDM cooling shroud 26 includes one or more shroud extension panels 46 supported by the lower panel 40 and extending to the bottom of the seismic support platform 24. Each extension panel 46 may be fabricated of from one or more sections. For example, each section could be fabricated of three 120° arcuate sections which are welded or otherwise suitably jointed together.

The lower panel 40 of the CRDM cooling shroud 26 may have one or more inlet air nozzles or ports 48 for introducing cooling air from the general atmosphere in the compartment 16 into the CRDM shroud 26. The air ports 48 are preferably located below the CRDM electromagnetic coils (not shown). The air nozzles or ports 48 may have a rectangular, circular or other regular or irregular cross-section.

The seismic support 24 may have a circumferential track 49 for supporting a movable hoist (not shown) for supporting a stud tensioner (not shown). A stud tensioner may be employed to tension and/or detension the RPV nuts 50 which seal the RPV closure head 20 against the RPV 10 during power operations at pressures of up to 2250 psi or more and temperatures of up to 650° F. or more.

The seismic support platform 24 is supported by. lift rods 52 bolted to mounts 54 on the closure head 20. The seismic support platform 24 has lift connections or lugs 56 that connect with a detachable lift rig such as lifting tripod 58 having stabilizers 60. The lift rig 58 also has a lift eye 62 that may be engaged by an overhead polar crane (not shown) for removing and replacing the head assembly 14 as a unit. In an ice condenser plant, a cable tray or bridge (not shown) may be employed for supporting CRDM cables, control rod position indicator cables, thermocouple lines and electrical lines (not shown)between the seismic support plate 24 and the walls of the RPV compartment 16.

The seismic support platform 24 will have internal apertured spacer plates (not shown) for laterally supporting the upper ends of the CRDMs 22. The apertures are sized to provide a total cross sectional area sufficient to permit the cooling air to flow through the seismic support platform 24 at acceptable pressure drops. Struts (not shown) will extend horizontally from the seismic support platform 24 to the walls of the RPV cavity 16 to horizontally stabilize the seismic support platform 24.

The plenum 28 is mounted on top of the seismic support platform 24. The plenum 28 must fit between the seismic support platform 24 and the missile shield 30 during power operations. Also, the plenum 28 must not interfere with the assembly of the lift rig 58 or its stabilizers 60 during refueling operations.

A plurality of spool pieces 70 are connected between the plenum 28 and the ductwork 72 of the ventilation system 74. As is shown in FIG. 1, each spool piece 70 has a first end 80 connected with the plenum 28 such that there is a lifting lug 56 between each of the connections with the first ends 80. Also, each spool piece 70 has a second end 82 connected adjacent the seismic support plate 24 to the existing ductwork 72 via a union 84.

FIG. 1 also shows a retrofitted ventilation system 74 including a ventilation fan 86 for pulling heated air from the plenum 28 and blowing the air through a heat exchanger 88 and discharging the air to the general atmosphere of the containment building. Alternatively, the heat exchanger 88 may be located upstream of the ventilation fan 86. In addition to retrofitting the integrated head assembly 14 in an existing ice condenser plant, the flow of cooling air through the ventilation system 74 must be reversed to provide the direction of flow shown in FIG. 1.

Figure 2:
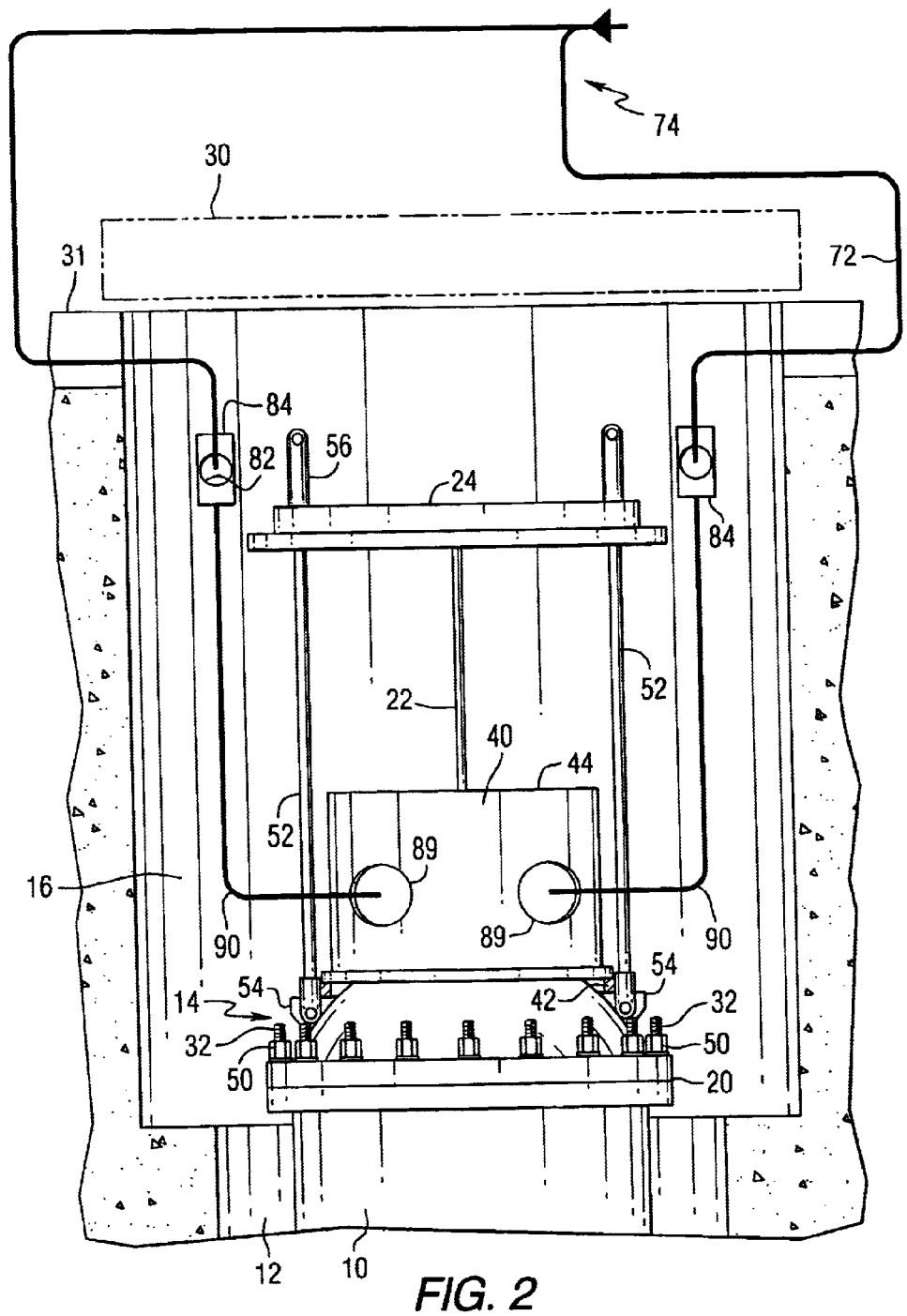
FIG. 2 is a schematic representation of a RPV head in an ice condenser plant before modification in accordance with a practice of the present invention.

FIG. 2 illustrates an existing ice condenser plant prior to a modification in accordance with the present invention. The RPV head 20 has a cooling shroud 40 with a terminal end 44 spaced from its seismic support platform 24, which opens the terminal end 44 and CRDMs 22 to the local atmosphere in the RPV compartment 16. The shroud 40 also has a plurality of air ports 89 connected (via ductwork 90 and unions 84) with the plant ductwork 72 extending to a plant ventilation system 74, for directing air from the general atmosphere in the containment building into the shroud 40 to cool the CRDMs 22. In the preferred practice of the present invention, the portion of the ductwork 90 extending below the seismic support plate 56 between the RPV head 20 and the existing ductwork 72 is replaced by a removable spool piece 70. As is illustrated by FIG. 1, spool pieces 70 preferably extend from a plenum 28 mounted on the seismic support plate 24 to the ductwork 72 via the unions 84.

Thus, in the practice of the present invention, an existing RPV integrated head assembly 14 in an ice condenser plant may be retrofitted by: removing the portions of the ductwork 72 (illustrated in phantom by ductwork 90) that originally extended below the unions 84 to outlets adjacent the original cooling shroud panel 40; employing extension panels 52 to extend the existing CRDM cooling shroud 40 to the seismic support platform 24; mounting the plenum 28 on the seismic support platform 24 in air flow communication with interior portion of the extended CRDM cooling shroud 26; and connecting one end 80 of the removable spool pieces 70 to the plenum 28 and connecting the second end 82 of the removable spool pieces 70 to the ductwork 72 adjacent to the seismic support platform 24. Advantageously, in the course of a later refueling operation, personnel working from the operating deck can safely remove the RPV integrated head 14 with reduced exposure to radiation. Also, no scaffolding is required for assembly and disassembly of the spool pieces with the result of increased safety and reduced costs. Finally, the spool pieces 70 may remain with the integrated head assembly 14 during its removal.

While a present preferred embodiment of the present invention has been shown and described, it is to be understood that the invention may be otherwise variously embodied within the scope of the following claims of invention.

What is claimed is:

1. In a pressurized water nuclear reactor having a containment building containing ice condenser compartments for absorbing heat in the event of a loss of coolant accident, a reactor pressure vessel (RPV) having a head assembly, a missile shield superposed over the head assembly and a ventilation system for directing cooling air from within the containment building toward the head assembly; the head assembly including a RPV head, a plurality of control rod drive mechanisms (CRDMs) extending upwardly from the RPV head, a seismic support platform above the RPV head laterally supporting the CRDMs, a plurality of lift connections extending upwardly of the seismic support platform for connecting with a detachable lift rig, and a CRDM cooling shroud surrounding a portion of the CRDMs and extending upwardly from the RPV head to a terminal end spaced from the seismic support platform; and the ventilation system including ductwork extending from a ventilation fan and a heat exchanger to an outlet located adjacent the head assembly between the RPV closure head and the seismic support platform;

a method of retrofitting the RPV head assembly comprising the steps of:

removing at least a portion of the ventilation ductwork extending below the seismic support platform;

extending the CRDM cooling shroud to the seismic support platform;

mounting a plenum on the seismic support platform and in air flow communication with interior portion of the extended CRDM cooling shroud and under the missile shield;

connecting one end of a removable spool piece to the plenum and a second end of the removable spool piece to the ductwork such that the spool piece extends between the lift connections, the connection of the one end of the removable spool piece being above the seismic support platform and the connection of the second end of the removable spool piece being adjacent to the seismic support platform; and reversing the flow of cooling air through the ventilation system for directing cooling air from the head assembly.

2. A pressurized water nuclear reactor comprising:

a containment building containing ice condenser compartments for absorbing heat in the event of a loss of coolant accident and having a reactor cavity;

a reactor pressure vessel (RPV) disposed in the reactor cavity, the RPV having a head assembly; the head assembly including a RPV head, a plurality of control rod drive mechanisms (CRDMs) extending upwardly from the RPV head, a seismic support platform above the RPV head laterally supporting the CRDMs, a plurality of lift connections extending upwardly of the seismic support platform, and a CRDM cooling shroud having an interior portion in which the CRDMs are located and extending upwardly from the RPV head to the seismic support platform;

a concrete missile shield superposed over the head assembly;

a plenum mounted on the seismic support platform and in air flow communication with the interior portion of the CRDM cooling shroud and disposed under the concrete missile shield;

a ventilation system including ductwork extending from an outlet adjacent the head assembly to an inlet of a ventilation fan; and a removable spool piece having a first end connected to the plenum and a second end connected to the outlet of the ductwork with the spool piece extending between the lift connections, the connection of the first end of the spool piece being above the seismic support platform and the connection of the second end of the spool piece being adjacent to the seismic support platform.

3. The nuclear reactor of claim 2 wherein the ventilation fan has an outlet and the ventilation system includes a heat exchanger connected by ductwork with the outlet of the ventilation fan.

4. The nuclear reactor of claim 2 wherein the ventilation system includes a heat exchanger disposed in the ductwork between the outlet adjacent to the seismic support platform and the inlet of the ventilation fan.

5. A RPV head assembly in a pressurized water nuclear reactor backfitted by the method of claim 1.

* * * * *